(12) United States Patent
Kitaura et al.

(10) Patent No.: US 11,100,800 B2
(45) Date of Patent: Aug. 24, 2021

(54) COLLISION DETERMINATION APPARATUS AND COLLISION DETERMINATION METHOD

(71) Applicants: DENSO CORPORATION, Kariya (JP); TOYOTA JIDOSHA KABUSHIKI KAISHA, Toyota (JP)

(72) Inventors: Shinji Kitaura, Kariya (JP); Takayuki Hiromitsu, Kariya (JP); Akihiro Kida, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 16/461,139

(22) PCT Filed: Oct. 30, 2017

(86) PCT No.: PCT/JP2017/039083
§ 371 (c)(1),
(2) Date: May 15, 2019

(87) PCT Pub. No.: WO2018/092568
PCT Pub. Date: May 24, 2018

(65) Prior Publication Data
US 2020/0074860 A1   Mar. 5, 2020

(30) Foreign Application Priority Data
Nov. 17, 2016 (JP) .............................. JP2016-224531

(51) Int. Cl.
*G08G 1/16* (2006.01)
(52) U.S. Cl.
CPC .............. *G08G 1/16* (2013.01); *G08G 1/166* (2013.01)

(58) Field of Classification Search
None
See application file for complete search history.

(56) References Cited

U.S. PATENT DOCUMENTS 9,862,416 B2 * 1/2018 Imai ...................... G08G 1/168
2010/0042323 A1   2/2010 Harada et al.
(Continued)

FOREIGN PATENT DOCUMENTS

CN          101622160 A    1/2010
JP          2015-191650 A  11/2015

OTHER PUBLICATIONS

Li Xiaowu, Curve and Surface Intersection Algorithm for Geometric Modeling Software System, Chongqing University, Oct. 10, 2005, 9 pgs.

*Primary Examiner* — John F Mortell
(74) *Attorney, Agent, or Firm* — Maschoff Brennan

(57) ABSTRACT

A collision determination apparatus includes: an own vehicle route estimating unit that estimates a route of an own vehicle; a target object route estimating unit that estimates a route of a target object; and a collision determining unit that performs a collision determination regarding the own vehicle and the target object. When the own vehicle route estimating unit estimates the route of the own vehicle to be circular arc-shaped, the collision determining unit divides a circular arc indicating the route of the own vehicle into a plurality of circular arcs, approximates each of the divided circular arcs as a straight line by connecting an end point and an end point of each of the divided circular arcs, and performs the collision determination based on whether any of the approximated straight lines and the route of the target object intersect.

12 Claims, 3 Drawing Sheets

(56) References Cited

U.S. PATENT DOCUMENTS

2011/0160950 A1* 6/2011 Naderhirn ............. G05D 1/106
                                                      701/28
2011/0246071 A1* 10/2011 Tsunekawa ............ G08G 1/166
                                                      701/301

* cited by examiner (a)

(b)

(c)

(d)

COLLISION DETERMINATION APPARATUS AND COLLISION DETERMINATION METHOD

CROSS-REFERENCE TO RELATED APPLICATIONS

The present application is a national stage application of PCT Application No. PCT/JP2017/039083, filed on Oct. 30, 2017, which claims priority to Japanese Patent Application No. 2016-224531, filed on Nov. 17, 2016, the descriptions of which are incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a collision determination apparatus that performs a collision determination regarding an own vehicle and a target object, and a collision determination method.

BACKGROUND ART

Conventionally, a collision determination apparatus that performs a collision determination regarding an own vehicle and a target object is known (for example PTL 1). In PTL 1, a collision determination apparatus for cases in which the own vehicle makes a turn without side-slipping is described. The collision determination apparatus projects a detection point that indicates a target object to be subjected to the determination on a predetermined side of a rectangle that indicates the own vehicle so as to rotate and move the detection point with reference to a center point of the turn, and determine the collision with the target object based on a deviation angle difference before and after the projection of the detection point and a deviation angle difference of a route of the vehicle that is a circular arc. That is, upon fixing the own vehicle, the collision determination apparatus virtually moves the detection point indicating the target object to be subjected to the determination and thereby performs the collision determination with the own vehicle. As a result, compared to a method in which the collision determination with the target object is performed by the own vehicle being virtually gradually advanced, the collision determination with a vehicle that is traveling on a circular arc can be accurately performed without calculation load being increased.

CITATION LIST

Patent Literature

[PTL 1] JP-A-2015-191650

SUMMARY OF INVENTION

Here, in PTL 1, a collision determination regarding a stationary target object and the own vehicle is presumed. However, the target object to be subjected to the determination is not necessarily stationary. For example, a traveling vehicle may be subjected to the determination. In this case, the collision determination is performed by a route of the own vehicle and a route of another vehicle being estimated. Specifically, the collision determination apparatus estimates the route of the traveling vehicle with which there is a risk of collision based on changes in the position of the traveling vehicle, and estimates the route of the own vehicle based on a traveling state of the own vehicle. Then, the collision determination apparatus determines whether the estimated route of the own vehicle and route of the other vehicle intersect. When determined that the estimated routes intersect, the collision determination apparatus determines that a collision will occur.

However, when the collision determination is performed in this manner, a problem arises in that calculation load (processing load) becomes large depending on the circumstances. For example, when the own vehicle and the other vehicle are both advancing straight ahead, the estimated routes are both straight lines. In this case, because an intersection between straight lines is determined, a linear equation is merely required to be solved. Meanwhile, when the own vehicle makes a turn and the other vehicle is advancing straight ahead, the route of the own vehicle is a curved line. The route of the other vehicle is a straight line. In this case, an intersection between a straight line and a curved line is determined. Therefore, a quadratic equation is required to be solved. Consequently, the calculation load increases compared to when the own vehicle and the other vehicle are both advancing straight ahead.

The present disclosure has been achieved in light of the above-described issues. The main object of the present disclosure is to provide a collision determination apparatus that is capable of suppressing increase in calculation load in a collision determination regarding an own vehicle and a target object when the own vehicle makes a turn, and a collision determination method.

The present disclosure is configured in the following manner to solve the above-described issues.

The present disclosure provides a collision determination apparatus that includes: an own vehicle route estimating unit that estimates a route of an own vehicle; a target object route estimating unit that estimates a route of a target object; and a collision determining unit that performs a collision determination regarding the own vehicle and the target object. When the own vehicle route estimating unit estimates the route of the own vehicle to be circular arc-shaped and the target object route estimating unit estimates the route of the target object to be a straight line, the collision determining unit divides a circular arc indicating the route of the own vehicle into a plurality of circular arcs, approximates each of the divided circular arcs as a straight line by connecting an end point and an end point of each of the divided circular arcs, and performs the collision determination based on whether any of the approximated straight lines and the route of the target object intersect.

In the present disclosure, the circular arc indicating the route of the own vehicle is divided into a plurality of circular arcs and each of the circular arcs is approximated as a straight line. The collision determination is performed based on whether any of the approximated straight lines and a straight line indicating the route of the target object intersect. Therefore, solving of a quadratic equation is no longer necessary to determine an intersecting point between the route of the own vehicle and the route of the target object. Therefore, even when the route of the own vehicle is circular arc-shaped, increase in calculation load can be suppressed compared to when the route of the own vehicle is a straight line.

BRIEF DESCRIPTION OF DRAWINGS

The above-described object, other objects, characteristics, and advantages of the present disclosure will be further clarified through the detailed description herebelow, with reference to the accompanying drawings. The drawings are as follows.

DESCRIPTION OF EMBODIMENTS

Figure 1:
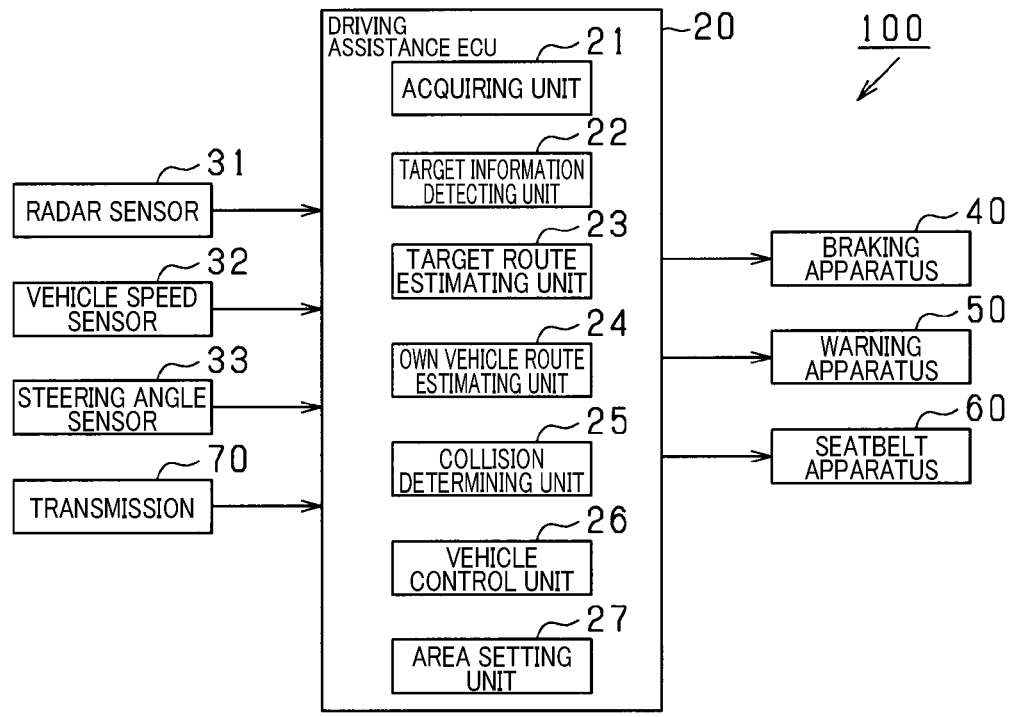
FIG. 1 is a configuration diagram of a PCSS.

An embodiment of the present disclosure will hereinafter be described with reference to the drawings. Sections among the embodiments below that are identical or equivalent to each other are given the same reference numbers in the drawings FIG. 1 shows a pre-crash safety system (PCSS) 100 to which the collision determination apparatus and the collision determination method are applied. The PCSS 100 is an example of a vehicle system that is mounted in a vehicle. The PCSS 100 detects an object that is positioned in a vehicle periphery. When a risk of collision between the detected object and the vehicle is present, the PCSS 100 performs an operation to avoid collision of the own vehicle with the object or an operation to mitigate the collision (PCS). Hereafter, the vehicle in which the PCSS 100 is mounted is referred to as an own vehicle CS. The object to be detected is referred to as a target object Ob.

The PCSS 100 shown in FIG. 1 includes various sensors, a driving assistance ECU 20, a braking apparatus 40, a warning apparatus 50, a seatbelt apparatus 60, and a transmission 70. According to the embodiment shown in FIG. 1, the driving assistance ECU 20 functions as the collision determination apparatus.

The various sensors are connected to the driving assistance ECU 20. The various sensors output detected information of the target object Ob and vehicle information related to the own vehicle CS to the driving assistance ECU 20. In FIG. 1, the various sensors include a radar sensor 31, a vehicle speed sensor 32, and a steering angle sensor 33. The radar sensor 31 serves as a radar apparatus.

For example, the radar sensor 31 is a publicly known millimeter-wave radar apparatus in which a millimeter wave-band high-frequency signal serves as a transmission wave. The radar sensor 31 is provided in a rear end portion of the own vehicle CS. The radar sensor 31 sets an area within a predetermined detection angle as a detection range and detects a position Pr of the target object Ob within the detection range. Specifically, the radar sensor 31 transmits a probe wave at a predetermined cycle and receives a reflected wave through a plurality of antennas. A distance to the target object Ob is calculated based on a transmission time of the probe wave and a reception time of the reflected wave. In addition, a relative speed is calculated based on a frequency of the reflected wave reflected by the target object Ob that changes as a result of the Doppler Effect. Furthermore, an orientation of the target object Ob is calculated based on a phase difference in the reflected wave received by the plurality of antennas. When the distance to the object Ob and the orientation can be calculated, a relative position of the target object Ob relative to the own vehicle SC can be identified. In addition, the radar sensor 31 sets a rear area of the own vehicle CS as the detection range.

The radar sensor 31 performs transmission of the probe wave, reception of the reflected wave, calculation of the distance, calculation of the orientation, and calculation of the relative speed at a predetermined cycle. The radar sensor 31 then outputs, to the driving assistance ECU 20, the calculated distance to the target object Ob, orientation, and relative speed of the target object Ob as radar detection information. The radar sensor 31 may calculate the relative position of the target object Ob and output the relative position as the radar detection information.

The vehicle speed sensor 32 detects a current vehicle speed of the own vehicle CS. Information indicating the detected vehicle speed is inputted to the driving assistance ECU 20. The steering angle sensor 33 detects a steering angle of a steering wheel (or tires). Information indicating the detected steering angle is inputted to the driving assistance ECU 20.

The braking apparatus 40 includes a brake mechanism and a brake ECU. The brake mechanism changes a braking force of the own vehicle CS. The brake ECU controls operation of the brake mechanism. The brake ECU is communicably connected to the driving assistance ECU 20, and controls the brake mechanism under control by the driving assistance ECU 20. For example, the brake mechanism includes a master cylinder, a wheel cylinder that applies the braking force to the wheel (tire), and an anti-lock braking system (ABS) actuator that adjusts distribution of pressure (hydraulic pressure) from the master cylinder to the wheel cylinder. The ABS actuator is connected to the brake ECU. The ABS actuator adjusts an operating amount for the wheel (tire) by adjusting the hydraulic pressure from the master cylinder to the wheel cylinder under control by the brake ECU.

The warning apparatus 50 issues a warning to a driver that the target object Ob that is approaching the own vehicle rear is present, under control by the driving assistance ECU 20. For example, the warning apparatus 50 is configured by a speaker that is provided inside the vehicle cabin and a display unit that displays images.

The seatbelt apparatus 60 is configured by a seatbelt that is provided for each seat in the own vehicle and a pretensioner that pulls the seatbelt. When the likelihood of the own vehicle CS colliding with the target object Ob increases, the seatbelt apparatus 60 performs a preliminary operation of pulling the seatbelt as a PCS operation. In addition, when the collision cannot be avoided, the seatbelt apparatus 60 pulls the seatbelt to eliminate slack, thereby fixing a passenger, such as the driver, to the seat and protecting the passenger.

The transmission 70 sets a shift position of the own vehicle CS by a shift lever or the like (not shown) being operated by the driver. For example, the shift position includes at least an R position (reverse) that is a position indicating that the own vehicle CS is in a reversing state, and a D position (drive) that is a position indicating that the own vehicle CS is in an advancing state. An N position (neutral), a P position (parking), and the like are also shift positions. Information indicating the shift position is inputted to the driving assistance ECU 20.

The driving assistance ECU 20 is configured as a known microcomputer that includes a central processing unit (CPU), a read-only memory (ROM), and a random access memory (RAM). The driving assistance ECU 20 performs vehicle control of the own vehicle CS by referencing a calculation program and control data in the ROM. According to the present embodiment, when the own vehicle CS is in the reversing state, that is, the shift position is the R position, the driving assistance ECU 20 performs PCS. Specifically, when the shift position is the R position, the driving assistance ECU 20 acquires the radar detection information from the radar sensor 31 and detects the position Pr of the target object Ob based on the acquired radar detection information. Then, based on the detection result, the driving assistance ECU 20 performs PCS with at least any of the apparatuses 40, 50, and 60 as a subject to be controlled. When performing PCS, the driving assistance ECU 20 functions as an acquiring unit 21, a target object information detecting unit 22, a target object route estimating unit 23, an own vehicle route estimating unit 24, a collision determining unit 25, and a vehicle control unit 26 by running the program stored in the ROM. Each function will be described below.

The acquiring unit 21 acquires the radar detection information inputted from the radar sensor 31. In addition, the acquiring unit 21 acquires the information indicating the vehicle speed of the own vehicle CS from the vehicle speed sensor 32, and acquires the information indicating the steering angle from the steering angle sensor 33. Furthermore, the acquiring unit 21 acquires the information indicating the shift position from the transmission 70.

The target object information detecting unit 22 detects the position Pr of the target object Ob based on the radar detection information. Specifically, the target object information detecting unit 22 detects the position Pr on coordinates of which the own vehicle CS is a point of origin, based on the distance and orientation of the target object Ob included in the radar detection information. In the coordinates, an X axis is set along a vehicle-width direction of the own vehicle CS and a Y axis is set along an advancing direction of the own vehicle CS. More specifically, a center point of the left and right rear wheels of the own vehicle CS is set as the point of origin. As a result, the relative position of the target object Ob relative to the own vehicle CS is detected. Here, a lateral direction orthogonal to the advancing direction (Y-axis direction) is the vehicle-width direction (X-axis direction). In addition, when the radar detection information includes the relative position of the target object Ob, the relative position may be acquired and used as the detection result. The position Pr is recorded in history information.

Figure 2:
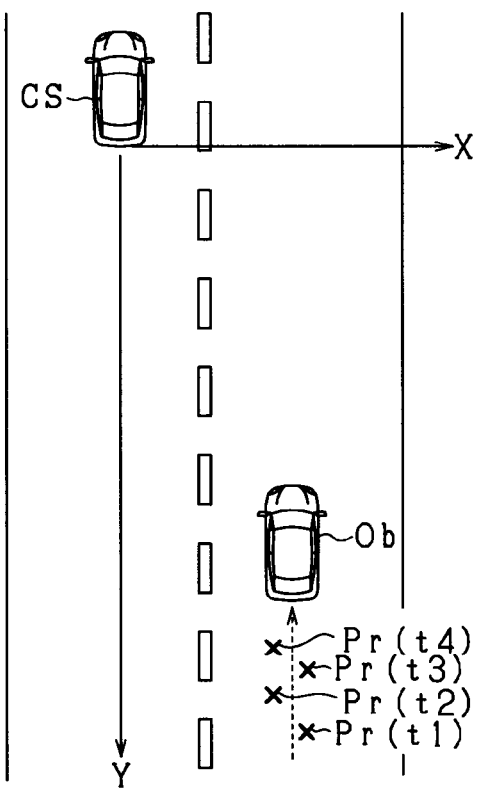
FIG. 2 is a diagram of a route of a target object.

The target object route estimating unit 23 estimates a route of the target object Ob based on changes in the position Pr stored as the history information. For example, as the route of the target object Ob, a movement-direction vector of the target object Ob is calculated. In FIG. 2, the position Pr of a vehicle detected as the target object Ob at each time from time t1 to t4 and the route of the target object Ob calculated based on the positions Pr are shown. Time t4 is a newest position Pr of the target object Ob recorded in the history information. For example, the target object route estimating unit 23 estimates a straight line passing through a position closest to each position Pr as the route of the target object Ob using a known linear interpolation calculation referred to as a least-square method.

The own vehicle route estimating unit 24 estimates a route of the own vehicle CS based on the vehicle speed and the steering angle. For example, when the steering angle is not 0 degrees, the own vehicle route estimating unit 24 calculates a turning radius based on the vehicle speed and the steering angle. In addition, the own vehicle route estimating unit 24 calculates a turning center point with the point of origin as a starting point, based on the steering angle and the turning radius. Then, the own vehicle route estimating unit 24 identifies a circle (curved line) based on the calculated turning radius and turning center point. In addition, the own vehicle route estimating unit 24 identifies a terminal point based on the identified circle (curved line) and the vehicle speed. Specifically, the own vehicle route estimating unit 24 identifies a position after a predetermined amount of time (such as 10 seconds) based on the identified circle (curved line) and the vehicle speed, and sets the identified position as the terminal point. Then, the own vehicle route estimating unit 24 estimates a circular arc-shaped trajectory obtained by moving the starting point to the terminal point along the circle (curved line) as the route of the own vehicle CS.

When the steering angle is 0 degrees, the own vehicle route estimating unit 24 estimates the route of the own vehicle CS to be a straight line. In addition, when the vehicle speed is 0 km/h, the own vehicle is stopped. The route of the own vehicle CS is fixed at the point of origin. In addition, when the own vehicle CS makes a turn (when the steering angle is not 0 degrees), the route is calculated under an assumption that the own vehicle CS will not side-slip. However, the circular arc-shaped route may be estimated taking into consideration side-slipping.

Furthermore, a method for identifying the position of the terminal point relative to the starting point, that is, a length of the estimated route may be arbitrarily changed. A position to which the starting point is moved at a predetermined angle along the identified circle may be set as the terminal point. Alternatively, a position to which the starting point is moved at an angle based on the vehicle speed may be set as the terminal point. In addition, a position to which the starting point is moved by a predetermined distance in the Y-axis direction (or the X-axis direction) may be set as the terminal point. Alternatively, a position to which the starting point is moved by a distance based on the vehicle speed in the Y-axis direction (or the X-axis direction) may be set as the terminal point. Alternatively, a position to which the starting point is moved by a fixed distance along the identified circle may be set as the terminal point. Moreover, the terminal point may be prescribed based on the turning radius.

The collision determining unit 25 determines whether the own vehicle CS and the target object Ob will collide (whether a likelihood of a collision is present) based on the estimated route of the target object Ob and route of the own vehicle CS. For example, when the route of the target object Ob and the route of the own vehicle CS intersect, the collision determining unit 25 determines that the likelihood of a collision between the own vehicle CS and the target object Ob is present.

When the likelihood of a collision is determined to be present, the vehicle control unit 26 calculates a distance (predicted collision distance) to an intersecting point (predicted collision point) between the route of the target object Ob with which the likelihood of a collision is determined to be present and the route of the own vehicle CS. Then, the vehicle control unit 26 controls the warning apparatus 50, the braking apparatus 40, and the seatbelt apparatus 60 based on the TTC, and thereby performs PCS.

Here, when the own vehicle CS is parked in a parking lot or the like, the own vehicle CS often makes a turn while traveling in reverse. In addition, the rear of the own vehicle CS tends to become a blind spot for the driver. Therefore, when the own vehicle CS makes a turn while traveling in reverse, the risk of a collision with a traveling vehicle or the like behind the own vehicle CS is high compared to when the own vehicle CS is advancing forward. Thus, when the own vehicle CS makes a turn while traveling in reverse, performance of PCS based on the collision determination regarding a traveling vehicle behind the own vehicle CS provides useful driving assistance for the driver.

However, in cases in which the own vehicle CS makes a turn, when the collision determination is performed based on whether the route of the own vehicle CS and the route of the target object Ob intersect, a problem arises in that the calculation load (processing load) increases compared to that when the own vehicle CS is advancing straight ahead. That is, when the own vehicle CS makes a turn, the route of the own vehicle CS is circular arc-shaped. Therefore, when the intersecting point with the route of the target object Ob indicated by a straight line is determined, a quadratic equation is required to be solved. Meanwhile, when the own vehicle CS is advancing straight ahead, a linear equation is solved to determine the intersecting point between the straight lines. Therefore, when the own vehicle CS makes a turn, the calculation load increases compared to when the own vehicle CS is advancing straight ahead.

Figure 3:
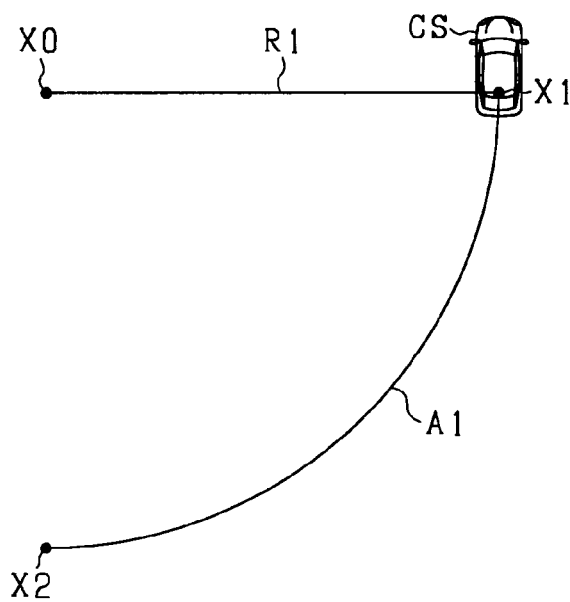
FIG. 3 illustrates, by (a) to (d), diagrams for explaining a method for approximating a route of an own vehicle.
Figure 3:
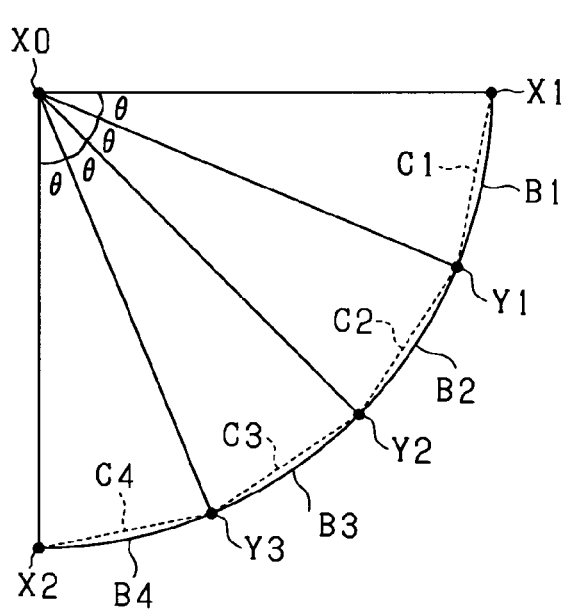
Figure 3:
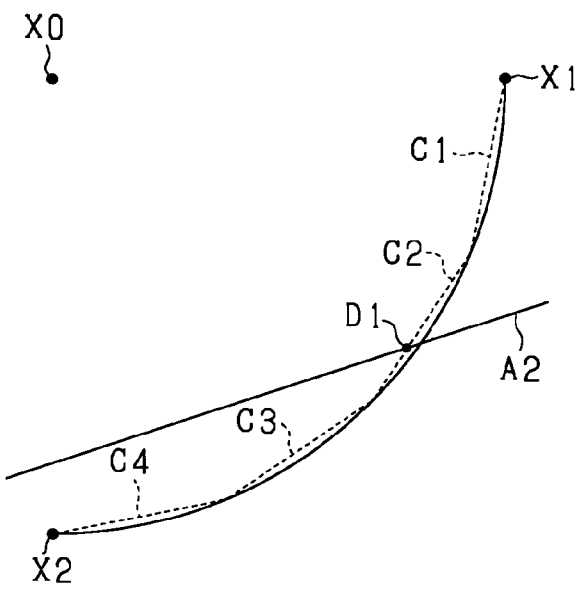
Figure 3:
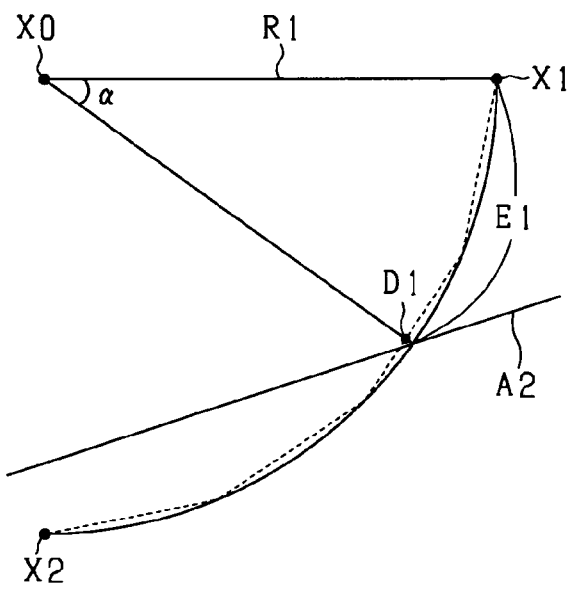

Here, when the own vehicle CS makes a turn while traveling in reverse, the collision determining unit 25 performs the collision determination by approximating the route of the own vehicle CS. Hereafter, a collision determination method will be described in detail with reference to FIG. 3. In FIG. 3, the turning center point is indicated by X0, the turning radius is indicated by R1, the route of the own vehicle CS is indicated by A1, the starting point is indicated by X1, the terminal point is indicated by X2, and the route of the target object Ob is indicated by A2.

As shown in FIG. 3 by (a), when the route A1 of the own vehicle CS is estimated to be circular arc-shaped, the collision determining unit 25 divides the circular arc indicating the route A1 of the own vehicle CS into a plurality of pieces. According to the present embodiment, the route A1 from the starting point X1 to the terminal point X2 is evenly divided into four pieces. Specifically, the collision determining unit 25 identifies an angle of the circular arc (route A1 of the own vehicle CS) from the starting point X1 to the terminal point X2, and calculates a division angle θ by dividing the identified angle into four. Then, as shown in FIG. 3 by (b), the collision determining unit 25 divides the circular arc (the route A1 of the own vehicle CS) based on the division angle θ, and obtains four circular arcs B1 to B4.

Then, as shown in FIG. 3 by (b), the collision determining unit 25 approximates each of the divided circular arcs B1 to B4 as a straight line, by connecting an end point and an end point of each of the divided circular arcs B1 to B4 with a straight line. Specifically, the collision determining unit 25 calculates the end point and the end point on each of the divided circular arcs B1 to B4, and respectively calculates approximated straight lines C1 to C4 by connecting the respective end points with a straight line. The position of each end point on the circular arcs B1 to B4 is calculated by a point being shifted by the division angle θ from the starting point along the circular arc.

That is, the end points of the circular arc B1 is the starting point X1 and an end point Y1 that is shifted by the division angle θ from the starting point X1. The straight line connecting the starting point X1 and the end point Y1 is the approximated straight line C1. In addition, the end points of the circular arc B2 are the end point Y1 and an end point Y2 that is shifted by the division angle θ from the end point Y1. The straight line connecting the end point Y1 and the end point Y2 is the approximated straight line C2. Furthermore, the end points of the circular arc B3 are the end point Y2 and an end point Y3 that is shifted by the division angle θ from the end point Y2. The straight line connecting the end point Y2 and the end point Y3 is the approximated straight line C3. In addition, the end points of the circular arc B4 are the end point Y3 and an end point Y4 that is shifted by the division angle θ from the end point Y3. The straight line connecting the end point Y3 and the end point Y4 is the approximated straight line C4.

As shown in FIG. 3 by (c), the collision determining unit 25 performs the collision determination based on whether any of the approximated straight lines C1 to C4 intersects with a straight line indicating the route A2 of the target object Ob. That is, the collision determining unit 25 determines whether an intersecting point D1 with the straight line indicating the route A2 of the target object Ob is present for each of the approximated straight lines C1 to C4. Here, when the intersecting point D1 between the approximated straight lines C1 to C4 and the straight line indicating the route A2 of the target object Ob is determined, the collision determining unit 25 is required to solve a linear equation for each. In addition, in FIG. 3 by (c), an aspect in which the approximated straight line C2 and the route A2 of the target object Ob intersect (an aspect in which the intersecting point D1 is present) is shown.

Figure 4:
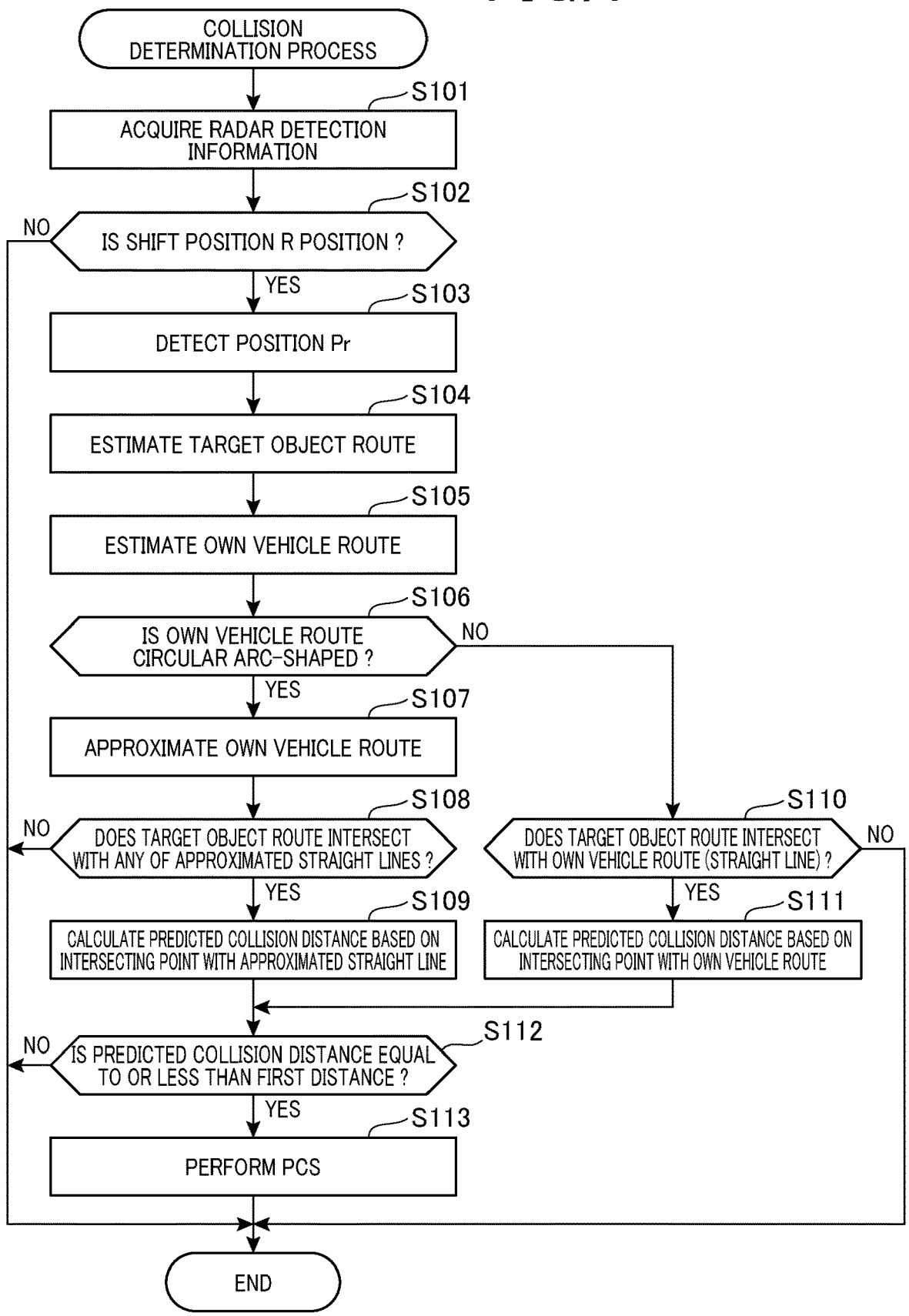
FIG. 4 is a flowchart of a collision determination process.

Next, a collision determination process performed by the driving assistance ECU 20 to perform PCS is described. The driving assistance ECU 20 performs the collision determination process at a predetermined cycle (such as 80 milliseconds). Hereafter, the collision determination process will be described with reference to FIG. 4.

The driving assistance ECU 30 acquires the radar detection information inputted from the radar sensor 31 (step S101). In addition, the acquiring unit 21 acquires the information indicating the vehicle speed of the own vehicle CS from the vehicle speed sensor 32, and acquires the information indicating the steering angle from the steering angle sensor 33. Furthermore, the acquiring unit 21 acquires the information indicating the shift position from the transmission 70.

The driving assistance ECU 20 determines whether the shift position is the R position (step S102). When determined that the shift position is not the R position (No at step S102), the driving assistance ECU 20 ends the collision determination process.

Meanwhile, when determined that the shift position is the R position (Yes at S102), the driving assistance ECU 20 detects the position Pr of the target object Ob based on the radar detection information (step S103). In addition, the driving assistance ECU 20 records the detected position Pr in the history information.

The driving assistance ECU 20 estimates the route of the target object Ob based on the changes in the position Pr stored as the history information (step S104). In addition, the driving assistance ECU 20 estimates the route of the own vehicle CS based on the steering angle and the like (step S105).

Next, the driving assistance ECU 20 determines whether the estimated route of the own vehicle CS is circular arc-shaped (step S106).

When determined that the estimated route of the own vehicle CS is circular arc-shaped (Yes at step S106), the driving assistance ECU 20 divides the circular arc indicating the route of the own vehicle CS into a plurality of circular arcs, and approximates each of the divided circular arcs as a straight line by connecting the end points of each of the divided circular arcs with a straight line (step S107).

Then, the driving assistance ECU 20 performs the collision determination based on whether any of the approximated straight lines and the straight line indicating the route of the target object intersect (step S108). That is, the driving assistance ECU 20 solves as many linear equations as the number of approximated straight lines and determines whether the intersecting point D1 is present.

When determined that the likelihood of a collision is not present (No at step S108), the driving assistance ECU 20 ends the collision determination process. Meanwhile, when determined that the likelihood of a collision is present (Yes at step S108), the driving assistance ECU 20 calculates the predicted collision distance (step S109).

When the route of the own vehicle CS is circular arc-shaped, that is, when the intersecting point D1 with the approximated straight line is calculated at step S108, for example, as shown in FIG. 3 by (d), the driving assistance ECU 20 identifies an angle α from the starting point X1 to the intersecting point D1 with the turning center point X0 as the center. Then, the driving assistance ECU 20 calculates a length of a trajectory E1 when the own vehicle CS moves on the circular arc indicating the route A1 of the own vehicle CS from the starting point X1 by the identified angle α. The driving assistance ECU 20 sets the calculated distance as the predicted collision distance. Here, the intersecting point D1 and the starting point X1 may be connected by a straight line and the distance of the straight line may be simply determined as the predicted collision distance.

Meanwhile, when determined that the route of the own vehicle CS is not circular arc-shaped (No at step S106), the driving assistance ECU 20 determines the likelihood of a collision between the own vehicle CS and the target object Ob by determining whether the routes intersect based on the estimated route of the target object Ob and route of the own vehicle CS (step S110). Specifically, the driving assistance ECU 20 determines whether the straight line indicating the route of the target object Ob and the straight line indicating the route of the own vehicle CS intersect by solving a linear equation.

When determined that the likelihood of a collision is not present (No at step S110), the driving assistance ECU 20 ends the collision determination process. Meanwhile, when determined that the likelihood of a collision is present (Yes at step S110), the driving assistance ECU 20 calculates the distance of the trajectory when the own vehicle CS moves along the route from the starting point to the intersecting point as the predicted collision distance (step S111).

Then, the driving assistance ECU 20 determines whether the calculated predicted collision distance is equal to or less than a predetermined first distance (step S112). The first distance is a distance at which PCS is started. For example, a value such as 10 meters is set. When determined that the calculated predicted collision distance is not equal to or less than the first distance (No at step S112), the driving assistance ECU 20 ends the collision determination process.

When determined that the calculated predicted collision distance is equal to or less than the first distance (Yes at step S112), the driving assistance ECU 20 performs PCS by controlling the warning apparatus 50, the braking apparatus 40, and the seatbelt apparatus 60 based on the predicted collision distance (step S113). For example, when the predicted collision distance is equal to or less than the first distance, the driving assistance ECU 20 controls the warning apparatus 50 and outputs a warning. When the predicted collision distance is equal to or less than a second distance (such as 5 meters) that is shorter than the first distance, the driving assistance ECU 20 controls the braking apparatus 40, in addition to the warning apparatus 50, and brakes the own vehicle CS. When the predicted collision distance is equal to or less than a third distance (such as 1 meter) that is shorter than the second distance, the driving assistance ECU 20 controls the seatbelt apparatus 60, in addition to the warning apparatus 50 and the braking apparatus 40, and tensions the seatbelt or the like. The driving assistance ECU 20 then ends the collision determination process.

The following effects are obtained as a result of the configuration described above.

The collision determining unit 25 divides the circular arc indicating the route of the own vehicle CS into a plurality of circular arcs, and approximates each as an approximated straight line. The collision determining unit 25 then determines whether any of the approximated straight lines and the straight line indicating the route of the target object intersect. Therefore, solving of a quadratic equation is no longer necessary. Increase in the calculation load can be suppressed even when the route of the own vehicle is a circular arc.

When dividing the circular arc indicating the route of the own vehicle in to a plurality of circular arcs, the collision determining unit 25 evenly divides the circular arc from the starting point to the terminal point. Therefore, each approximated straight line can approximate the circular arc with identical accuracy. In addition, when the collision determination is performed, deviations in accuracy depending on the type of the approximated straight line can be eliminated.

When the own vehicle CS makes a turn while traveling in reverse, the collision determination regarding the target object Ob behind the own vehicle CS is performed. Therefore, when the own vehicle CS makes a turn while traveling in reverse, the collision determination regarding the target object Ob behind the own vehicle CS which tends to be a blind spot of the driver can be performed without increasing the processing load. In addition, as a result of the processing load being reduced during the collision determination, leeway for other processes to be performed is created. Therefore, for example, PCS can be performed using the plurality of apparatuses 40, 50, and 60.

OTHER EMBODIMENTS

The present disclosure is not limited to the above-described embodiment and, for example, may be carried out in the following manner. Hereafter, sections that are identical or equivalent to each other among the embodiments are given the same reference numbers. Descriptions of sections having the same reference numbers are applicable therebetween.

The PCSS 100 may be used to perform PCS in the own vehicle CS relative to a target object Ob that is ahead of the own vehicle CS when the own vehicle is in a forward-advancing state (in the D position).

According to the above-described embodiment, when the route of the own vehicle CS is circular arc-shaped, the collision determining unit 25 divides the route into four circular arcs. However, the number of divisions may be arbitrarily changed. For example, the route may be divided into five circular arcs.

According to the above-described embodiment, when the route of the own vehicle CS is circular arc-shaped, the collision determining unit 25 calculates the division angle and divides the circular arc based on the calculated division angle. However, the division angle may be a predetermined angle (fixed angle).

According to the above-described embodiment, when dividing the circular arc indicating the route of the own vehicle into a plurality of pieces, the collision determining unit 25 evenly divides the circular arc such that the circular arc is evenly divided from the starting point to the terminal point. However, the circular arc may not be evenly divided. For example, the division angle may increase towards the terminal point. As a result, approximation can become more accurate closer to the own vehicle CS.

According to the above-described embodiment, the route of the own vehicle CS is estimated using the steering angle that is detected by the steering angle sensor 33. However, a yaw rate sensor may be used instead of the steering angle sensor 33, and the route of the own vehicle CS may be estimated based on the yaw rate and the vehicle speed.

The own vehicle route estimating unit 24 may estimate the route of the own vehicle CS to be a straight line when the steering angle is equal to or less than a predetermined angle (such as 1 degree to 5 degrees). At this time, the advancing direction of the own vehicle CS is determined based on the steering angle.

Even when the speed of the own vehicle CS is the same, the length of the circular arc indicated as the estimated route of the own vehicle CS changes (the position of the terminal point changes) based on the turning radius. Therefore, when the number of divisions or the division angle is the same at all times, an appropriate approximation may not be implemented in some cases. For example, when the number of divisions or the division angle is the same at all times, the accuracy decreases when the circular arc is long, compared to when the circular arc is short. Meanwhile, when the circular arc is short, the accuracy increases. Therefore, it may not be necessary for the number of divisions or the division angle to be the same. That is, unnecessary division is performed.

Therefore, the collision determining unit 25 may perform appropriate approximation by changing at least either of the number of divisions and the division angle when dividing the circular arc indicating the route of the own vehicle CS based on the radius of the circular arc (turning radius). For example, when the turning radius is large, the collision determining unit 25 may reduce the division angle compared to that when the turning radius is small. In addition, when the turning radius is large, the collision determining unit 25 may increase the number of divisions compared to that when the turning radius is small. As a result, the accuracy of approximation can be improved.

Even when the radius of the circular arc (turning radius) is the same, the length of the arc indicated as the estimated route of own vehicle CS changes (the position of the terminal point changes) based on the speed of the own vehicle CS. Therefore, when the number of divisions or the division angle is the same at all times, an appropriate approximation may not be implemented in some cases.

Therefore, the collision determining unit 25 may perform appropriate approximation by changing at least either of the number of divisions and the division angle when dividing the circular arc indicating the route of the own vehicle CS based on the radius of the circular arc (turning radius). For example, when the turning radius is large, the collision determining unit 25 may reduce the division angle compared to that when the turning radius is small. In addition, when the turning radius is large, the collision determining unit 25 may increase the number of divisions compared to that when the turning radius is small. As a result, the accuracy of approximation can be improved.

The vehicle control unit 26 may calculate a collision margin time (TTC) until the own vehicle CS and the target object Ob collide, instead of the predicted collision distance. The collision margin time is calculated by the distance to the target object Ob being divided by the relative speed relative to the target object Ob. Then, the vehicle control unit 26 may perform PCS based on the collision margin time.

According to the above-described embodiment, the position Pr of the target object Ob is detected using the detection information from the radar sensor 31. As another example, an imaging apparatus such as a camera may be provided. The driving assistance ECU 20 may acquire a captured image from the imaging apparatus and detect the position Pr of the target object Ob based on the captured image.

According to the above-described embodiment, when performing the collision determination, the collision determining unit 25 may determine whether the collision will occur taking into consideration the width of the own vehicle CS. For example, the collision determining unit 25 estimates a route through which a left-side rear wheel of the own vehicle SC passes and a route through which a right-side rear wheel passes, based on the estimated route of the own vehicle CS and the vehicle width of the own vehicle CS. Then, the collision determining unit 25 may perform the determination based on whether either of the estimated routes and the route of the target object Ob intersect. In a similar manner, the collision determination may be performed by taking into consideration the width of the target object Ob. At this time, the width of the target object Ob may be set to be greater than an actual value, and the collision determination may be performed with a margin being provided. When the route through which the left-side rear wheel of the own vehicle CS passes and the route through which the right-side rear wheel passes are estimated, as a result of the route of the own vehicle CS being approximated as the approximated straight line, increase in the calculation load can be further suppressed, compared to when approximation is not performed.

According to the above-described embodiment, when performing the collision determination, the collision determining unit 25 may determine whether the collision will occur taking into consideration a distance from the rear wheel of the own vehicle CS to a rear end of the own vehicle CS. For example, the collision determining unit 25 estimates a route through which a rear end portion (such as a rear bumper) of the own vehicle CS passes based on the estimated route of the own vehicle CS and the distance from the rear wheel of the own vehicle CS to the rear end of the own vehicle CS. Then, the collision determining unit 25 may make the determination based on whether the estimated route and the route of the target object Ob intersect.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

The invention claimed is:

1. A collision determination apparatus comprising:
   an own vehicle route estimating unit that estimates a route of an own vehicle;
   a target object route estimating unit that estimates a route of a target object; and
   a collision determining unit that performs a collision determination regarding the own vehicle and the target object, wherein
   when the own vehicle route estimating unit estimates the route of the own vehicle to be circular arc-shaped, the collision determining unit
   divides a circular arc indicating the route of the own vehicle into a plurality of circular arcs,
   approximates each of the divided circular arcs as a straight line by connecting end points of the divided circular arcs, and performs the collision determination based on whether any of the approximated straight lines and the route of the target object intersect.

2. The collision determination apparatus according to claim 1, wherein:
the collision determining unit sets at least either of a division angle and a number of divisions when dividing the circular arc indicating the route of the own vehicle into a plurality of circular arcs based on a radius of the circular arc.

3. The collision determination apparatus according to claim 2, wherein:
the collision determining unit sets at least either of a division angle and a number of divisions when dividing the circular arc indicating the route of the own vehicle into a plurality of circular arcs based on a vehicle speed of the own vehicle.

4. The collision determination apparatus according to claim 3, wherein:
the collision determining unit evenly divides the circular arc indicating the route of the own vehicle from a starting point to a terminal point when dividing the circular arc into a plurality of circular arcs.

5. The collision determination apparatus according to claim 4, wherein:
the own vehicle route estimating unit estimates the route of the own vehicle when the own vehicle is traveling in reverse; and
the target object route estimating unit estimates the route of the target object behind the own vehicle.

6. A collision determination method comprising:
estimating a route of an own vehicle;
estimating a route of a target object; and
performing a collision determination regarding the own vehicle and the target object, wherein
the collision determination method comprises
dividing a circular arc indicating the route of the own vehicle into a plurality of circular arcs when the route of the own vehicle is estimated to be circular arc-shaped,
approximating each of the divided circular arcs as a straight line by connecting end points of the divided circular arcs by a straight line, and
performing the collision determination based on whether any of the approximated straight lines and the route of the target object intersect.

7. The collision determination apparatus according to claim 1, wherein:
the collision determining unit sets at least either of a division angle and a number of divisions when dividing the circular arc indicating the route of the own vehicle into a plurality of circular arcs based on a vehicle speed of the own vehicle.

8. The collision determination apparatus according to claim 1, wherein:
the collision determining unit evenly divides the circular arc indicating the route of the own vehicle from a starting point to a terminal point when dividing the circular arc into a plurality of circular arcs.

9. The collision determination apparatus according to claim 2, wherein:
the collision determining unit evenly divides the circular arc indicating the route of the own vehicle from a starting point to a terminal point when dividing the circular arc into a plurality of circular arcs.

10. The collision determination apparatus according to claim 1, wherein:
the own vehicle route estimating unit estimates the route of the own vehicle when the own vehicle is traveling in reverse; and
the target object route estimating unit estimates the route of the target object behind the own vehicle.

11. The collision determination apparatus according to claim 2, wherein:
the own vehicle route estimating unit estimates the route of the own vehicle when the own vehicle is traveling in reverse; and
the target object route estimating unit estimates the route of the target object behind the own vehicle.

12. The collision determination apparatus according to claim 3, wherein:
the own vehicle route estimating unit estimates the route of the own vehicle when the own vehicle is traveling in reverse; and
the target object route estimating unit estimates the route of the target object behind the own vehicle.

* * * * *